(12) United States Patent
Specht et al.

(10) Patent No.: US 6,993,436 B2
(45) Date of Patent: Jan. 31, 2006

(54) DEVICE FOR MEASURING FORCE ON A SEAT BELT

(75) Inventors: Martin Specht, Feldafing (DE); Stefan Schwald, Herrsching (DE); Thomas Heckmayr, Rammingen (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 10/911,333

(22) Filed: Aug. 4, 2004

(65) Prior Publication Data

US 2005/0033529 A1 Feb. 10, 2005

(30) Foreign Application Priority Data

Aug. 6, 2003 (DE) ................................ 103 36 123

(51) Int. Cl.
*G06F 19/00* (2006.01)
*G01L 1/26* (2006.01)
*B60R 22/00* (2006.01)

(52) U.S. Cl. .................... 702/41; 73/862.391; 701/45
(58) Field of Classification Search ................. 702/41, 702/45–47, 75, 76, 145, 173; 701/45, 37; 73/862.391, 862.637; 324/207.26
See application file for complete search history.

(56) References Cited

U.S. PATENT DOCUMENTS

| 4,570,118 A | 2/1986 | Tomczak et al. |
| 5,915,286 A | 6/1999 | Figi et al. |
| 6,131,951 A | 10/2000 | Chicken et al. |
| 6,266,855 B1 | 7/2001 | Specht et al. |
| 6,389,661 B1 | 5/2002 | Brown et al. |
| 6,829,952 B2 * | 12/2004 | Stanley et al. .......... 73/862.391 |
| 2004/0044455 A1 * | 3/2004 | Ante et al. ..................... 701/45 |
| 2004/0079175 A1 * | 4/2004 | Dukart .................. 73/862.391 |

FOREIGN PATENT DOCUMENTS

| DE | 102 17 227 C1 | 5/2003 |
| DE | 102 04 846 A1 | 8/2003 |
| WO | WO 01/79039 A1 | 10/2001 |
| WO | WO 02/06092 A1 | 1/2002 |

* cited by examiner

*Primary Examiner*—Michael Nghiem
*Assistant Examiner*—John Le
(74) *Attorney, Agent, or Firm*—Lonnie Drayer

(57) ABSTRACT

A measuring device for measuring a pulling force acting on a belt webbing of a seat belt of a motor vehicle is located between an anchoring point of the seat belt on the vehicle and a connection device which is to be connected to the seat belt. The connection device, in relation to the anchoring point, can be moved against a spring bias. The measuring device is a magnetic field sensor that is arranged between two analogous poles of two permanent magnets.

20 Claims, 6 Drawing Sheets

DEVICE FOR MEASURING FORCE ON A SEAT BELT

FIELD OF THE INVENTION

The invention relates to a device for measuring the force acting upon a belt webbing of a three-point seat belt.

BACKGROUND OF THE INVENTION

In a three-point seat belt known from WO 02/06092, a Hall effect sensor is arranged between two permanent magnets. The Hall effect sensor in its starting position is located in the immediate proximity of one the two magnets. The two magnets are mounted on a carrier that is movable in a housing. The Hall effect sensor is fastened to a base plate securely connected to the vehicle structure. The movable magnet carrier is connected to a seat belt. If a child's seat is secured to a vehicle seat by the seat belt, a movement of the two permanent magnets in relation to the stationary Hall effect sensor takes place on the basis of the pulling force acting upon the belt webbing, whereby the Hall effect sensor is brought into the immediate proximity of the other permanent magnet. In this way, the occupation of the seat by a child's seat is indicated and the possibility of inflation of an airbag allocated to this vehicle seat is stopped. The movement of the magnet carrier is carried out against a bias force generated by springs.

WO 01/79039 teaches a measuring device located between an anchoring point positioned on a vehicle and a belt buckle that can be connected to the seat belt and is movable against a spring bias in relation to the anchoring point. The measuring device comprises a magnetic field generated by a permanent magnet, and in which a magnetic field sensor is arranged. Depending on a pulling force acting upon the belt webbing, a movement of the permanent magnet takes place in relation to the magnetic field sensor, the measuring signal of which is electronically evaluated for measuring the pulling force.

U.S. Pat. No. 6,081,759 teaches a force measuring device that is located in the region of the end fitting of a seat belt and measures the pulling force acting upon the belt webbing with a magnetic field sensitive sensor.

U.S. Pat. No. 6,081,759 teaches a measuring device arranged in the region of the end fitting. In a preferred embodiment, the measuring device is located in or on the belt buckle of the seat belt. In this case the magnetic field sensor is securely connected to the belt buckle frame made out of a solid material, for instance metal. A bolt is mounted on the belt buckle frame and during the strapping of the seat belt engages a buckle tongue attached to the belt webbing. The two permanent magnets are secured to a magnet holder, which is securely connected to the anchoring point on the vehicle. Buckle plates of the belt buckle frame can be extended accordingly, to provide the measuring device in between them.

SUMMARY OF THE INVENTION

There is provided in accordance with the present invention a device for measuring a force acting upon a belt webbing of a seat belt of a motor vehicle. A measuring device is located between an anchoring point of the seat belt on the vehicle and a connection device which is to be connected to the seat belt and which, in relation to the anchoring point, can be moved against a spring bias. The measuring device has two permanent magnets and a magnetic field sensor that can be moved in relation to the magnetic field created by the two permanent magnets. The magnetic field sensor is arranged between two analogous poles of the two permanent magnets.

DETAILED DESCRIPTION OF THE INVENTION

According to the present invention, a magnetic field sensor 4 is movably arranged between two analogous poles of two permanent magnets 5,6. The magnetic field sensor 4 supplies signals that are proportional to each magnetic induction and can be a Hall effect sensor or a magnetostrictive sensor or the like. The magnetic field sensor is preferably guided in a linear manner along a connection line 10 between the two analogous magnet poles. "In a linear manner along" means on the connection line of the two analogous magnet poles or parallel to this connection line.

Figure 1:
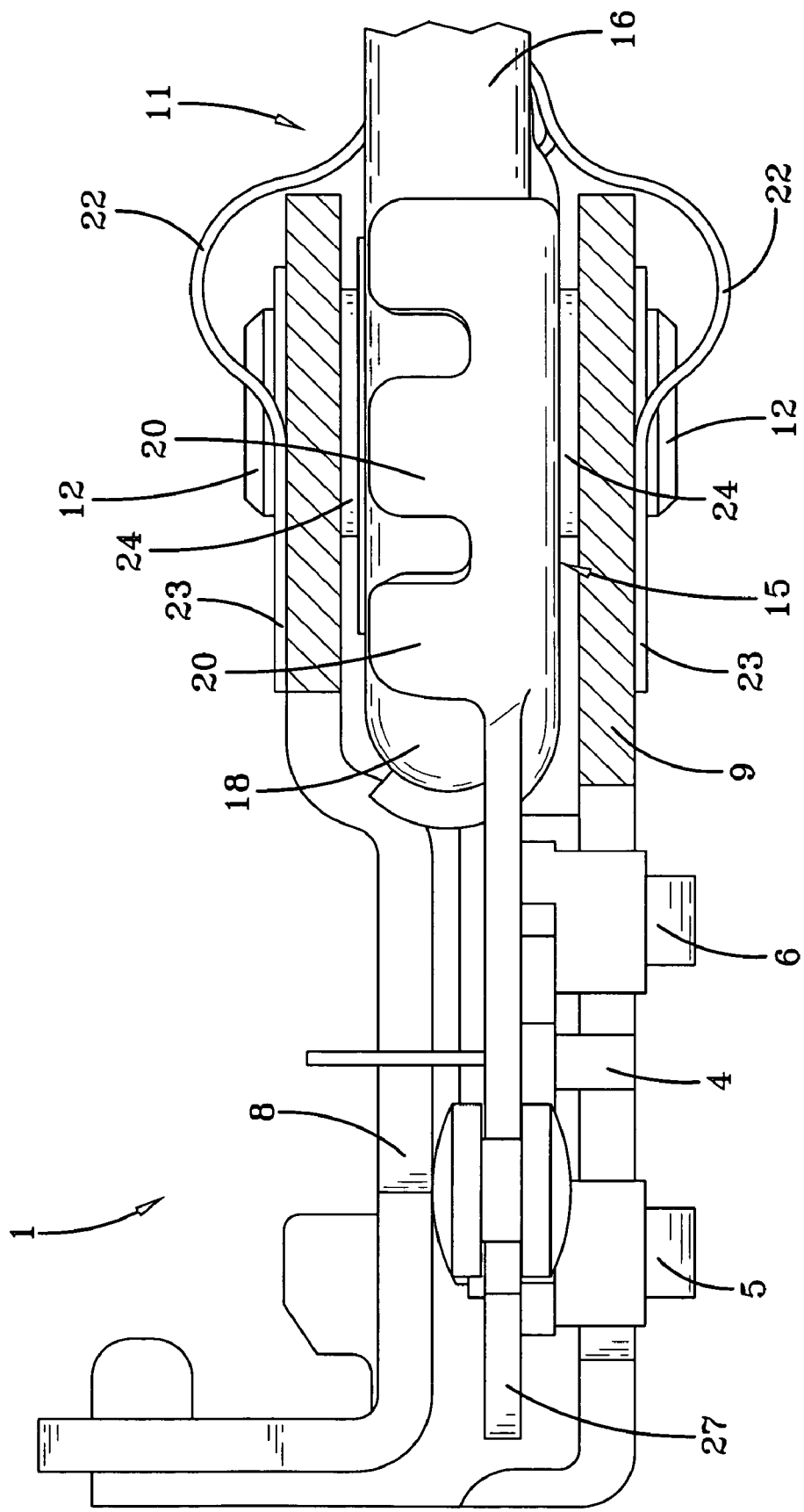
FIG. 1 is a side view of an embodiment of the invention in the region of a measuring device, at which a force acting upon the seat belt is measured.
Figure 2:
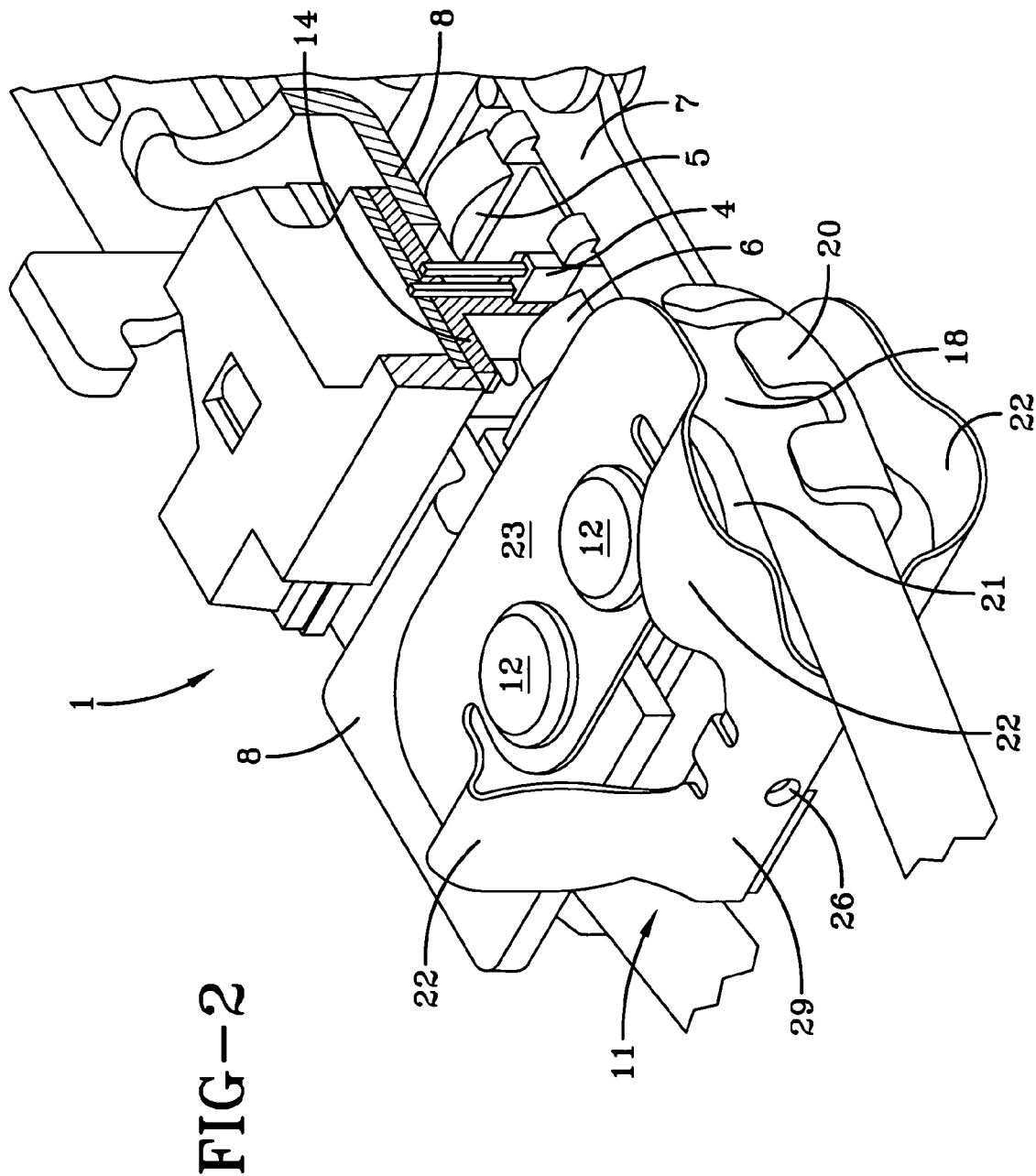
FIG. 2 is a perspective view of the embodiment of FIG. 1.
Figure 3:
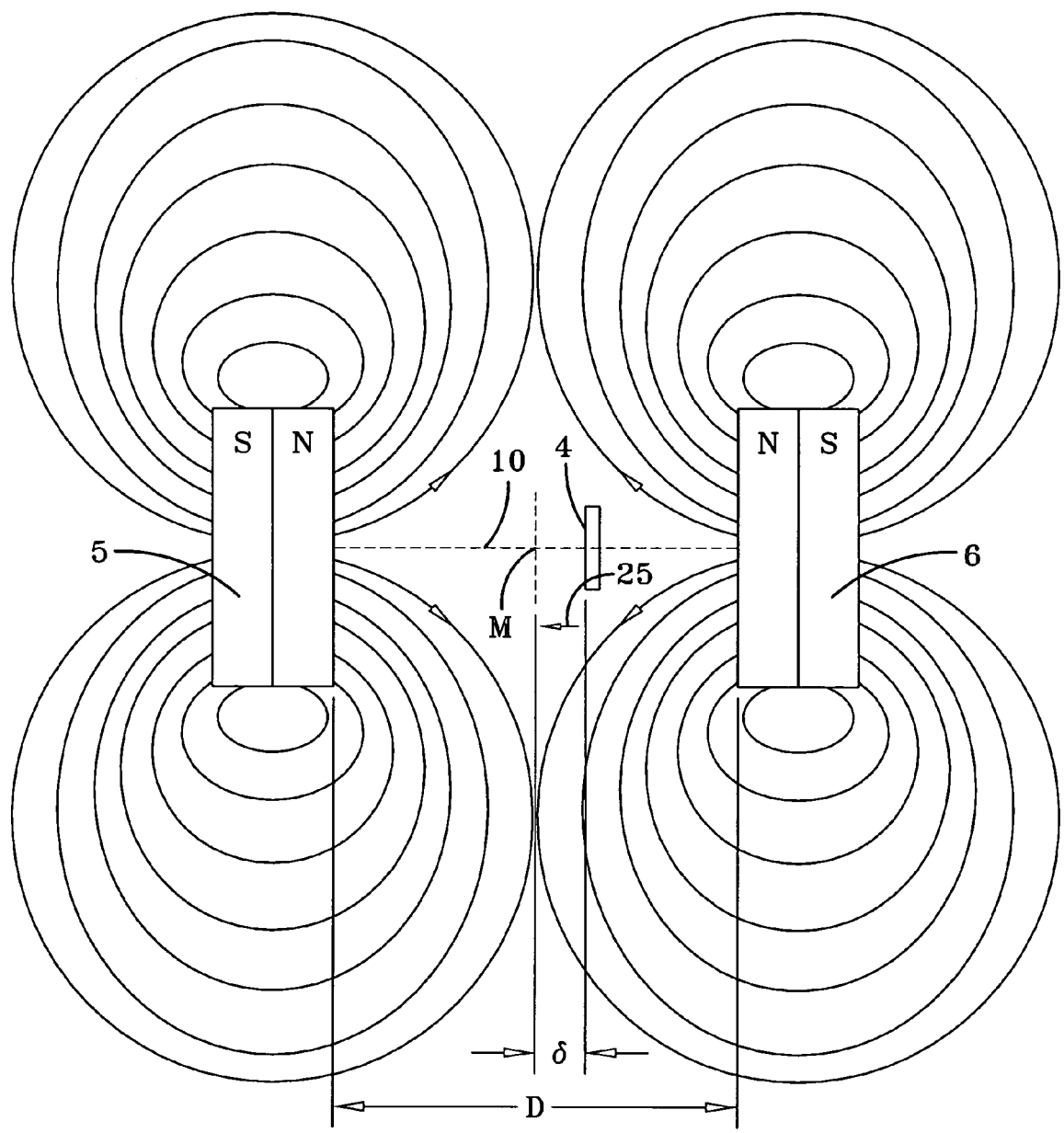
FIG. 3 is a diagrammatic view of the arrangement of the permanent magnets and the magnetic field sensor in the measuring device with a diagrammatic view of the magnetic field lines.

A measuring device 1 shown in FIGS. 1, 2 and 3 has a magnetic field sensor 4, which is arranged in the magnetic field of two permanent magnets 5, 6. The two permanent magnets 5, 6 are directed towards one another with their two analogous poles. In the shown embodiment, the two north poles N of the permanent magnets 5, 6 are directed towards one another. The magnetic field sensor 4 is positioned between these two analogous magnet poles. Instead of the two north poles N, the two south poles S of the permanent magnets 5, 6 can also be directed towards one another. In this type of arrangement, the magnetic field lines between the analogous magnet poles move from the diagrammatic course shown in FIG. 3 into a closer arrangement, in particular in the region of the distance midpoint M. The magnetic field sensor 4 is arranged in a displaced manner with respect to the distance midpoint M of a distance D separating two permanent magnets. In this exemplary example the distance δ from the distance midpoint M measures 0.5 mm. This distance δ can also be smaller, for instance 0.2 mm, or larger, for instance up to 1 mm. The distance D between the two permanent magnets 5, 6 is 7 mm in the shown embodiment. The distance D between the two permanent magnets 5, 6 can, however, be in the range of approximately 5 mm to approximately 10 mm. The magnetic field sensor 4, which is preferably a Hall effect sensor, is closer to the distance midpoint M than to the permanent magnet 6. In particular, the magnetic field sensor 4 is positioned at such a distance 25 from the distance midpoint M, that during a force measuring movement with respect to the magnetic field a linear dependence is present between the output signal supplied by the magnetic field sensor and the movement path covered. The total movement path of the magnetic field sensor 4 with respect to the magnetic field created between the two analogous magnet poles is measured in such a way that this output signal is linearly dependent on the movement of the sensor from its resting position. Possible influences on the linear character can be electronically compensated in the evaluation device and/or by calibration.

The two permanent magnets 5, 6 have identical measurements and generate magnetic fields with identical field forces and magnetic flux density characteristics. The magnetic field lines between the two analogous poles displace one another out of their normal field line course. The permanent magnets are preferably cylindrical. Their diameters can measure approximately 5.00 mm to 7.00 mm, preferably 6.28 mm. Their length can measure 2.00 mm to 3.00 mm, preferably 2.54 mm. The magnetic field sensor is in this case arranged in the common axis of the two cylindrical permanent magnets, whereby this common axis runs perpendicularly to the sensor surface.

In its starting or resting position, the magnetic field sensor 4 is preferably non-centrally distanced from the two permanent magnet poles 5,6. This means that in its starting or resting position, the magnetic field sensor is at a shorter distance to the one magnet pole than to the other magnet pole. The magnetic field sensor, however, is positioned more closely to the distance middle point M than to one of the two permanent magnets 5,6. This ensures that the magnetic field sensor is positioned in a region of the field created by the two permanent magnets, in which the outlet signal of the magnetic field sensor is essentially linearly proportional to its movement out of the starting position during the force measurement.

The magnetic field sensor 4 is arranged with its leaf plane, penetrated by the magnetic field lines, perpendicular to a common axis 10 of the cylindrical permanent magnets 5, 6. Preferably a semi-conductor leaf, in particular a cast semi-conductor leaf, is used as the magnetic field sensor 4. The permanent magnets 5, 6 may comprise conventional alloys, for instance Ne—Fe—B (Neodymium-Iron-Boron), or of alloys of rare-earth elements with cobalt, for instance Sn—Co (Samarium-Cobalt). The electrical connections to evaluating electronics for the measuring signals supplied by the magnetic field sensor 4 are achieved by highly flexible cables or highly flexible strip conductors. The magnetic field sensor 4 and the evaluating electronics are covered by a cast mass 14 and thus protected from environmental influences. The cast mass block 14 is for instance secured to an extended plate 8 of a belt buckle frame.

The magnetic field sensor 4 is securely connected to a connection device 3. This connection device 3 is or can be connected to the belt webbing of the seat belt, whereby, during the arrangement of the measuring device 1 in the region of an end fitting of the seat belt, the connection device can comprise a fastening eyelet for the seat belt webbing or a seat belt buckle.

Figure 6:
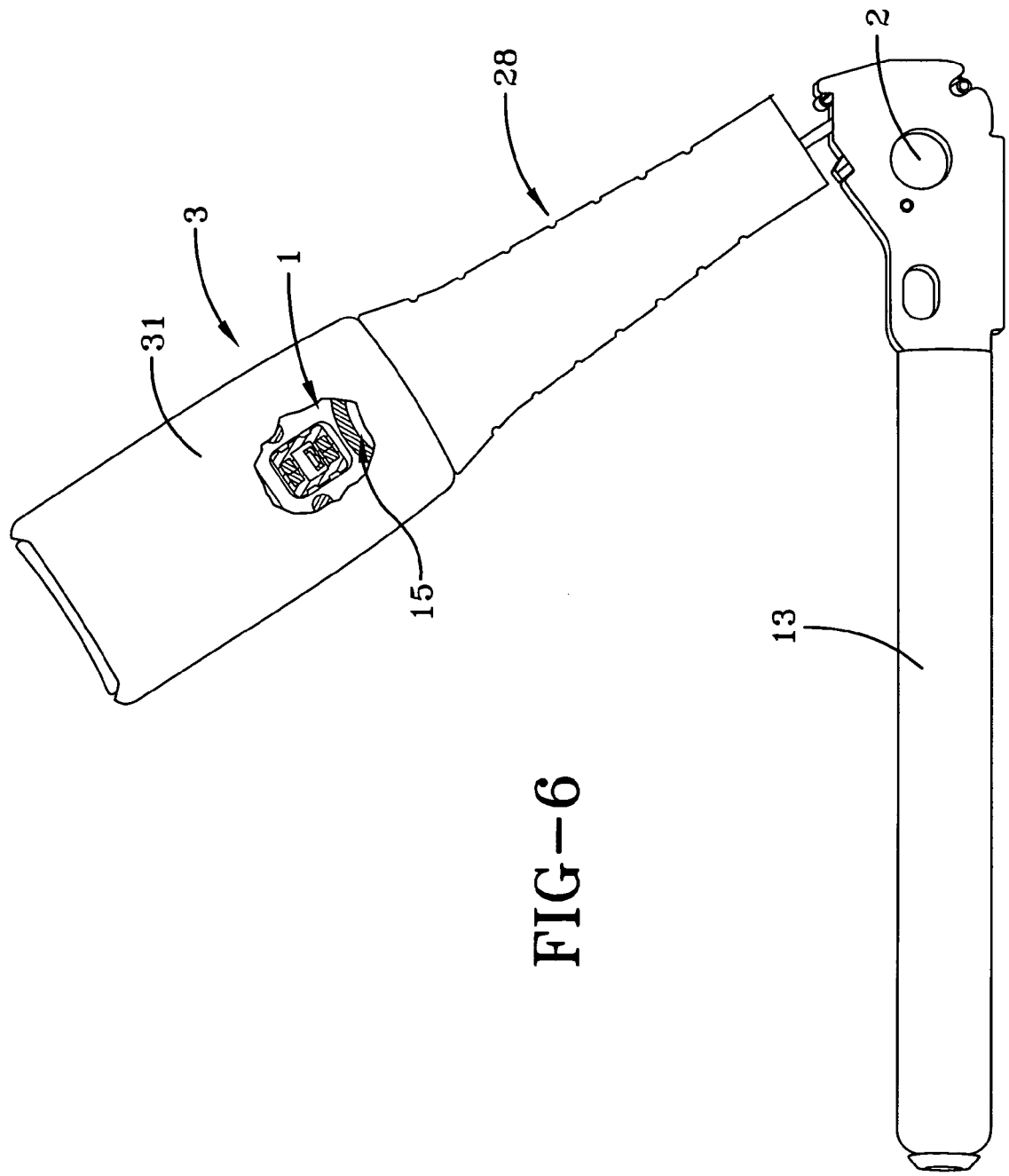
FIG. 6 shows a belt buckle of a seat belt, which is provided with the measuring device of FIG. 1, and which is connected to a belt tightening device anchored to the vehicle structure.

In the shown embodiment of FIGS. 1, 2 or 6 the connection device 3 is a belt buckle of the seat belt. The belt buckle can for instance have the structure shown in U.S. Pat. No. 6,266,855 B1, which is incorporated herein by reference for the purpose of teaching the structure of a belt buckle that may be employed in the practice of the present invention. As shown in FIG. 1, the measuring device 1 is positioned at an extension of belt buckle plates 8, 9 of the belt buckle frame.

Figure 5:
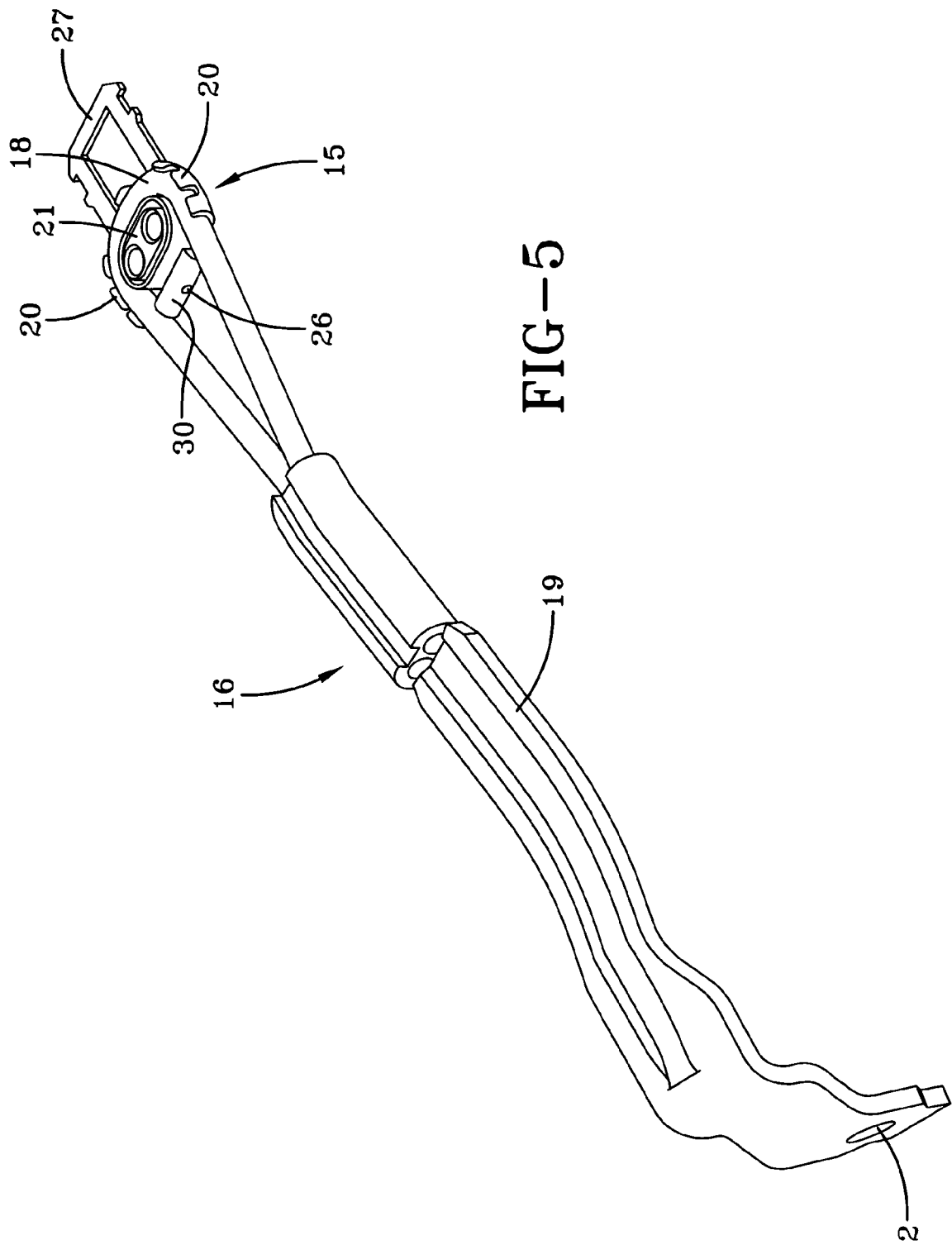
FIG. 5 shows a connection device, with which the measuring device of FIG. 1 can be anchored to the vehicle structure.

The permanent magnets 5, 6 are fastened to a magnet holder 7, which is connected via a connection device shown in FIG. 5 to an anchoring point 2, which is to be secured to the vehicle structure. Using a fastening assembly 15 the magnet holder 7 is securely connected to the connection device 16. This connection (FIGS. 1, 2, 5) takes place via a cable loop 18 of the connection device 16. The cable loop 18 is secured to an anchoring fitting 19, on which the anchoring point 2 is foreseen (FIG. 5). The cable loop can also be arranged on wire cables extending to the anchoring point. The cable loop 18 is placed around an internal loop guide 21 arranged on the magnet holder 7. An interlocking connection between the cable loop 18 and the magnet holder 7 is achieved in connection with the loop guide 21 by one or more clamps 20, which are securely connected to the magnet holder 7 or are integral with the magnet holder 7. An embodiment of the connection device 16 is shown in FIG. 5. Instead of the shown embodiment, other connection devices can also be used. For instance, a fitting extending from the anchoring point 2 to the fastening assembly 15 can be used. The latter can be rigid or spring-loaded depending on its use position.

As shown in FIGS. 1 and 2, the two buckle plates 8, 9 are connected to the magnet holder 7 in the region of their ends using a spring 11, which in this embodiment is a two-legged spring. The spring 11 has arched spring legs 22, which are securely connected to the extended buckle plates 8, 9. Each arched spring leg 22 continues until a level spring part 23, which rests upon in each case the buckle plates 8, 9. The level spring parts 23 are fastening links with connection points. On the two connection points shown in the embodiment, each spring leg 22 is securely connected to the two buckle plates 8, 9, for instance by threaded fasteners, rivets or similarly acting fastening means 12. For the two-legged spring, which on the one hand is connected to the magnet holder and on the other hand to the connection device, in particular to the belt buckle frame, a steel alloy is suitable, in particular stainless steel with a sheet thickness of 0.25 mm and a tensile strength in the region of 1400 N/mm$^2$ to 1800 N/m$^2$.

As shown in FIG. 2, the spring legs 22, which end in the level spring part 23, can be bow-shaped. In FIG. 2 the two bow-shaped spring legs are connected to one another by a transverse spring connection element 29. The spring connection element is preferably connected in an interlocking manner with a support device 30 located on the magnet holder 7 (FIG. 5). In the region of the connection element, a fastening assembly 26 can be foreseen, in which the spring connection element 29 and thus the spring 11 are additionally fastened to the magnet holder 7. In this manner, a vehicle-secure mounting of the spring 11 is achieved, which is connected to the belt buckle frame (buckle plates 8, 9) via the spring legs 22. The spring legs 22 in each case have spring characteristics. These spring characteristics have the effect of a spring bias in the movement direction of the magnetic field sensor 4 which is securely connected to the belt buckle frame. The spring legs 22 preferably have identical spring characteristics. In FIG. 2, the spring legs 22 and the level spring part 23 are formed from one spring steel sheet. The arching of each spring leg 22 runs essentially in the movement direction of the magnetic field sensor 4. The sheet thickness can for example be 0.25 mm with a tensile strength of the sheet material of 1400 N/mm$^2$ to 1800 N/mm$^2$.

The measurements of the magnetic field sensor are extremely low in comparison to the measurements of the front faces on the magnet poles. The movement of the magnetic field sensor with respect to the magnetic field takes place against a spring bias, which is preferably created by a spring comprising two spring legs. The spring has the ability to extend, preferably also perpendicularly to the movement direction of the magnetic field sensor. Each of the two spring legs has spring characteristics in the movement direction of the magnetic field sensor. The two spring legs preferably have identical spring characteristics. For a straight linear movement of the magnetic field sensor during the force measurement, the two spring legs are secured to the connection element or, when the connection element is the belt buckle, they are connected to the buckle frame. The connection point of the two spring legs is securely connected to the vehicle structure. Since the magnet holder is also securely connected to the vehicle structure, the connection point, at which the two spring legs are connected to one another, can be secured to the magnet holder. The two spring legs are preferably bow-shaped. They can be created from wire hoops or flat sheet metal hoops. It is also possible to design the two spring legs as arched leaf springs with the spring characteristics in the movement direction of the magnetic field sensor.

Due to the straight linear movement of the magnetic field sensor 4, in particular in or along the middle line 10 connecting the two magnet poles together, a sensor outlet signal can be achieved which is preferably linearly dependent on the movement path. Due to the arrangement according to the invention, a particularly linear sensor is thus achieved for the detection of the force acting upon the belt webbing of the seat belt, in particular the pulling force. The surface of the leaf-shaped magnetic field sensor, in particular the Hall effect sensor, thereby extends preferably in a manner perpendicular to the connection middle line between the two magnet poles. At least in the region in which the Hall effect sensor is movably arranged, the two permanent magnets create opposite magnetic fields, which have identical flux density characteristics and identical field forces. In this way a precise detection of the flux density characteristics of the permanent magnetic fields between the two analogous permanent magnet poles and thus of the signals corresponding in each case to the sensor position, and which are evaluated for the force measurement, is obtained. Influences restricting the linear character of the sensor signal can be electronically compensated.

With the help of the spring, the belt buckle frame, which can comprise one or two parallel plates, is guided parallel to the permanent magnets which are secured to the magnet holder, in particular to the joint cylinder axis of the permanent magnets. In this way, the straight linear movement of the magnetic field sensor connected to the belt buckle frame is achieved. The bolt mounted on the buckle frame and engaging the belt tongue ensure the connection to the seat belt.

Figure 4:
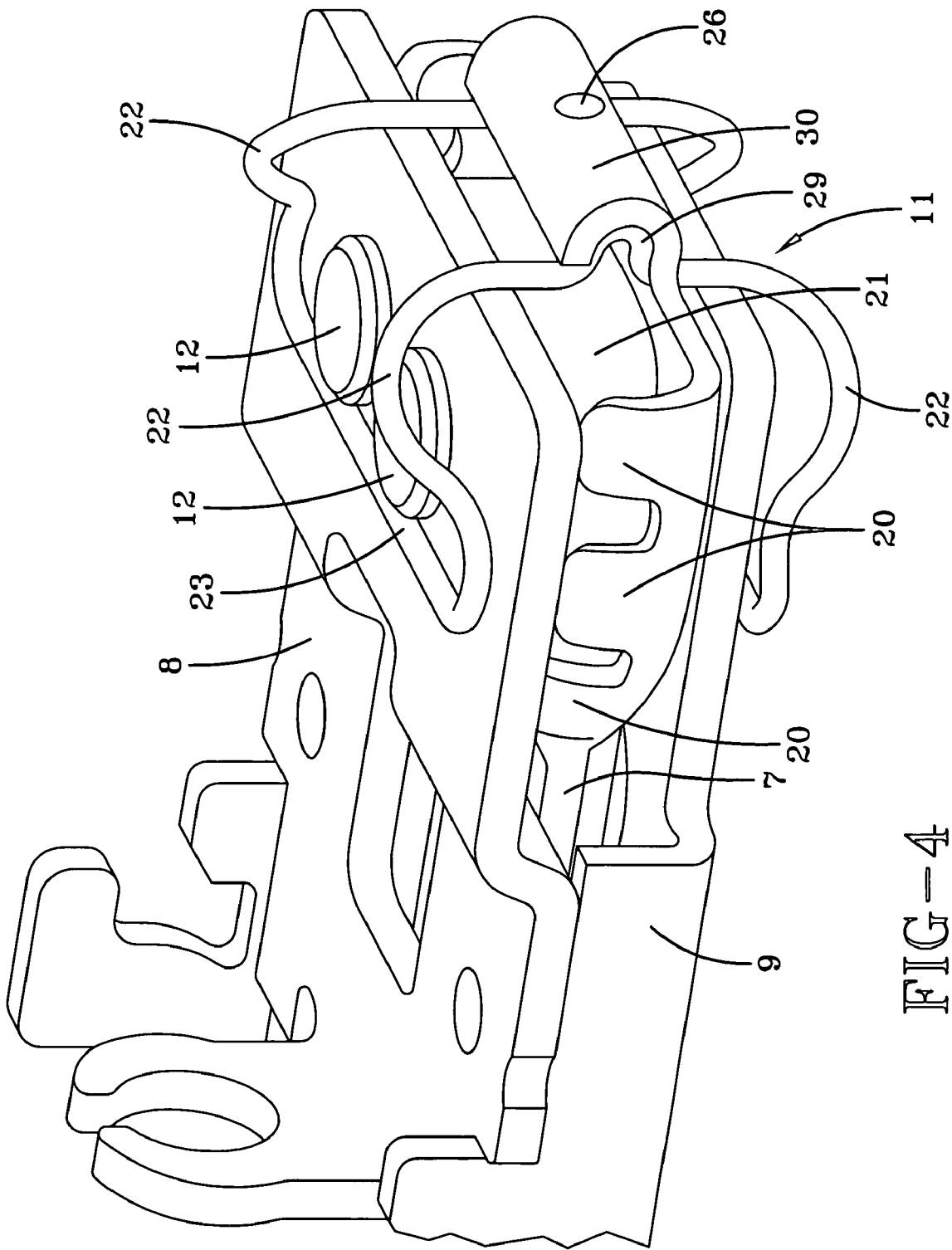
FIG. 4 shows an embodiment of a spring that can be used in the embodiment shown in FIG. 1.

In FIG. 4 the spring 11 comprises two wire-shaped stirrup parts. These stirrup parts create the spring legs 22. In the region of the transverse level spring part 23 the connection with the buckle plates 8, 9 of the belt buckle frame is achieved by a fastening means 12. Integral connection elements 29, which form U-shaped wire stirrup parts, are supported in the support device 30, which is formed on the magnet holder 7. In a fastening assembly 26, the connection elements 29 of the wire-shaped spring legs can be additionally secured. Several fastening assemblies 26 can also be foreseen.

For the purpose of a defined movement direction of the belt buckle frame with respect to the magnet holder 7 fastened to the vehicle structure, a low-friction guide 24 is located in the region of the fastening assembly 15, in which the magnet holder 7 is connected to the cable loop 18. This low-friction guide can be a guide slide or a guide roll. The low-friction guide 24 functions between the two buckle plates 8, 9 and the magnet holder 7. In addition, in the region of a transverse frame part 27 (FIGS. 1, 5) of the magnet holder 7, a low-friction guide, which functions between the extended buckle plates 8, 9 and the magnet holder 7, can also be foreseen.

In the event of a force acting upon the belt webbing, the magnetic field sensor is moved from its starting or resting position in the direction of the center of the distance between the two magnet poles, and if necessary moved beyond this. The movement of the magnetic field sensor 4 from its resting position as shown in FIGS. 1, 2 and 3 takes place in the direction of the distance midpoint M between the two permanent magnets 5, 6 (towards the left in FIG. 3) and can extend beyond this. The magnetic field sensor 4 can be moved within a maximum region of approximately 1.5 mm along the axis 10 of the permanent magnets 5, 6. This movement region can also be smaller, for instance approximately 0.5 mm or approximately 1.00 mm. The limiting of this measuring path can be carried out by an abutment that is secured to the vehicle, for instance located on the magnet holder 7. In this way, the measuring region of the measuring device 1 is for instance limited to 10 kN. The magnetic field sensor can also be in contact with an abutment secured to the vehicle during its starting or resting position.

The movement of the magnetic field sensor 4 from its resting or starting position is caused when a force acts upon the belt webbing of the seat belt. As a result of the connection of the belt buckle with the seat belt, this force is transferred onto the buckle plates 8, 9 of the belt buckle frame and works against the spring bias generated by the spring 11. The belt buckle frame and the connected magnetic field sensor 4 are moved in the direction of the arrow 25 in FIGS. 1 and 3 along the axis 10 as a result of this force. The movement path is proportional to the pulling force acting upon the webbing. The magnetic field sensor 4 thus arrives at a flux density region of the magnetic field created by the permanent magnets 5, 6, which is different to that of the starting position. The sensor signal generated by the magnetic field sensor 4 is thus a measure for the force acting upon the belt webbing.

In the shown embodiment, the belt buckle has two extended buckle plates 8, 9 of the belt buckle frame, between which the magnet holder 7 is arranged. The two permanent magnets 5, 6 are fastened to the magnet holder 7. The magnet holder 7 is securely connected to the connection device 16 of FIG. 5 by the cable loop 18. In this example, the belt buckle with the force sensor arranged in the buckle housing has a total length of less than 100 mm, in particular the belt buckle length with the force measuring device located in the housing is 93 mm to 102 mm.

The two buckle plates 8, 9 are securely connected to the legs 22 of the spring 11 by their end regions. At the spring connection point 29, with which the spring legs 22 are connected, one or several fastening assemblies 26, at which the spring 11 is fastened to the magnet holder 7, is/are provided. The relative movement between the belt buckle frame and the vehicle-secure anchoring required for the force measurement does not restrict the functions of the belt buckle components, in particular with respect to shock safety and tightening ability.

The belt buckle and the measuring device can preferably be mounted as a unit on a retensioning part of a seat belt tightening drive, in particular of a buckle pretensioner, which is secured to the vehicle structure in the anchoring point. In addition, the seat belt tightening device and the belt buckle can be manufactured with the measuring device as a pre-assembled unit, which is secured to the vehicle structure in the anchoring point. To this effect the belt buckle can be tightened and can for instance be structured in such a way as described in U.S. Pat. No. 6,266,855 B1, which is incorporated herein by reference for the purpose of teaching a seat belt buckle and belt tightening system that can be used in the practice of the present invention.

In the embodiment of FIG. 6, the connection device is a belt buckle and the measuring device 1 located on the extension of the belt buckle frame are fastened to a pulling component 28 of a belt tightening device 13. The measuring device 1 and the fastening assembly 15 are arranged with the belt buckle components in a joint housing 31. This type of joint housing 31 is also foreseen in the embodiments of FIGS. 1 and 2. The housing 31 is partly broken down in FIG. 6, so that the measuring device 1 and the fastening assembly 15 are visible. The tightening device 13 is designed in a known manner, as disclosed for instance in U.S. Pat. No. 6,131,951, and is fastened at the anchoring point 2 to the vehicle structure. U.S. Pat. No. 6,131,951 is incorporated herein by reference for the purpose of teaching a device for retensioning a seat belt that may be employed in the practice of the present invention. The anchoring point 2 is positioned at a deflector on which the pulling component 28 which engages the magnet holder 7, designed for instance as a traction cable, is deflected. The tightening device 13, the belt buckle, the measuring device 1 and the component 28 which is to be retensioned can be a pre-assembled unit, which is fastened at the anchoring point 2 to the vehicle structure. The belt buckle is shock-safe and thus can be tightened. This type of belt buckle is known from U.S. Pat. No. 6,266,855 which is incorporated herein by reference for the purpose of teaching a seat belt buckle that may be used in the practice of the present invention.

In the preferred embodiment, due to the relative movement of the magnetic field sensor with respect to the permanent magnets, the operability of the components of the belt buckle is not restricted. This is achieved in that the magnetic field sensor is securely connected to the belt buckle frame, and is movably secured with regard to the permanent magnet secured to the vehicle structure by the magnet holder for the force measurement. The measurement arrangement can also be kinematically reversed, i.e. the permanent magnets can be secured to the belt buckle frame and the magnetic field sensor can be secured to the vehicle by a corresponding support device. In a preferred manner the measuring device created by the permanent magnets and by the magnetic field sensor arranged between them, is positioned in the region of an extension of the belt buckle frame, in particular in the region of two parallel plates of the belt buckle frame. The support device securely connected to the vehicle structure for the two permanent magnets or, in the case of kinematic reversal, for the magnetic field sensor, is in this case guided between the two plates of the belt buckle frame.

In the foregoing specification, the invention has been described with reference to specific embodiments thereof. It will, however, be evident that various modifications and changes can be made thereto without departing from the broader spirit and scope of the invention as set forth in the appended claims. The specification and drawings are accordingly, to be regarded in an illustrative rather than restrictive sense.

We claim:

1. A measuring device for measuring a force acting upon a belt webbing of a seat belt of a motor vehicle is located between an anchoring point of the seat belt on the vehicle and a connection device that is to be connected to the seat belt and which, in relation to the anchoring point, can be moved against a spring bias, whereby the measuring device comprises two permanent magnets, the two permanent magnets each have north and south poles and are spaced apart and arranged such that either the north poles of the magnets are directed towards one another or the south poles of the magnets are directed towards one another, and a magnetic field sensor that is located between the two permanent magnets and can be moved in relation to a magnetic field created by the two permanent magnets in a linear manner along a connection line between the poles of the permanent magnets that are directed towards one another.

2. The measuring device according to claim 1, wherein the magnetic field sensor is arranged at a non-central distance between the poles of the permanent magnets that are directed towards one another in a starting or resting position, and wherein during the force measurement the magnetic field sensor is moved in relation to the magnetic field from the starting or resting position towards the center of the distance between the magnet poles.

3. The measuring device according to claim 2, wherein a sensor signal generated at the measuring device is proportional to the length of movement of the magnetic field sensor from the starting or resting position.

4. The measuring device according to claim 2, wherein the magnetic field sensor is a Hall effect sensor or a magnetostrictive sensor.

5. The measuring device according to claim 1, wherein a sensor signal generated at the measuring device is proportional to the length of movement of the magnetic field sensor from the starting or resting position.

6. The measuring device according to claim 5, wherein the magnetic field sensor is a Hall effect sensor or a magnetostrictive sensor.

7. The measuring device according to claim 1, wherein the magnetic field sensor is a Hall effect sensor or a magnetostrictive sensor.

8. The measuring device according to claim 1, wherein the magnetic field sensor is securely connected to the connection device and the two permanent magnets are securely connected to the anchoring point.

9. The measuring device according to claim 8, wherein the connection device is a belt buckle and the magnetic field sensor is fastened to a frame of the belt buckle.

10. The measuring device according to claim 9, wherein the belt buckle frame is movably arranged against the force of a spring, in relation to a magnet holder secured to a structural member of the vehicle, the spring having bow-shaped spring legs fastened to a connection element or to the buckle frame.

11. The measuring device according to claim 10, wherein a unit comprising the belt buckle and the measuring device is fastened to a component which is to be pulled by a tightening device.

12. The measuring device according to claim 10, wherein the belt buckle frame is movably arranged against a force of a spring in relation to the magnet holder, the spring having spring legs fastened to the connection element or to the buckle frame, each spring leg being bow shaped.

13. The measuring device according to claim 9, wherein a unit comprising the belt buckle and the measuring device is fastened to a component which is to be retensioned by a tightening device.

14. The measuring device according to claim 1, wherein the two permanent magnets are cylindrical, the magnetic field sensor being located on a common axis of the two cylindrical permanent magnets.

15. A measuring device for measuring a force acting upon a belt webbing of a seat belt of a motor vehicle is located in a seat belt buckle that is connected to an anchoring point on the vehicle, the belt buckle has a belt buckle frame that is movably arranged against the force of a spring, in relation to a magnet holder, the measuring device comprising:
   two permanent magnets connected to the magnet holder, the two permanent magnets each have north and south poles and are spaced apart and arranged such that either the north poles of the magnets are directed towards one another or the south poles of the magnets are directed towards one another; and
   a magnetic field sensor that is located between the permanent magnets in a starting or resting position that is closer to one of the permanent magnets than the other, and during a force measurement the magnetic field sensor is moved in a linear manner along a connection line between the two permanent magnets in relation to the magnetic field from the starting or resting position towards the center of the distance between the two magnets.

16. The measuring device according to claim 15, wherein a sensor signal generated at the measuring device is proportional to the length of movement of the magnetic field sensor from the starting or resting position.

17. The measuring device according to claim 16, wherein the magnetic field sensor is a Hall effect sensor or a magnetostrictive sensor.

18. The measuring device according to claim 15, wherein the magnetic field sensor is a Hall effect sensor or a magnetostrictive sensor.

19. The measuring device according to claim 15, wherein the two permanent magnets are cylindrical, the magnetic field sensor being located on a common axis of the two cylindrical permanent magnets.

20. The measuring device according to claim 15, wherein the belt buckle and the measuring device is fastened to the anchoring point by a component which is to be pulled by a tightening device.

* * * * *